No. 624,689. Patented May 9, 1899.
W. S. SCHUYLER.
MOTOR VEHICLE.
(Application filed Apr. 1, 1898.)
(No Model.) 3 Sheets—Sheet 1.
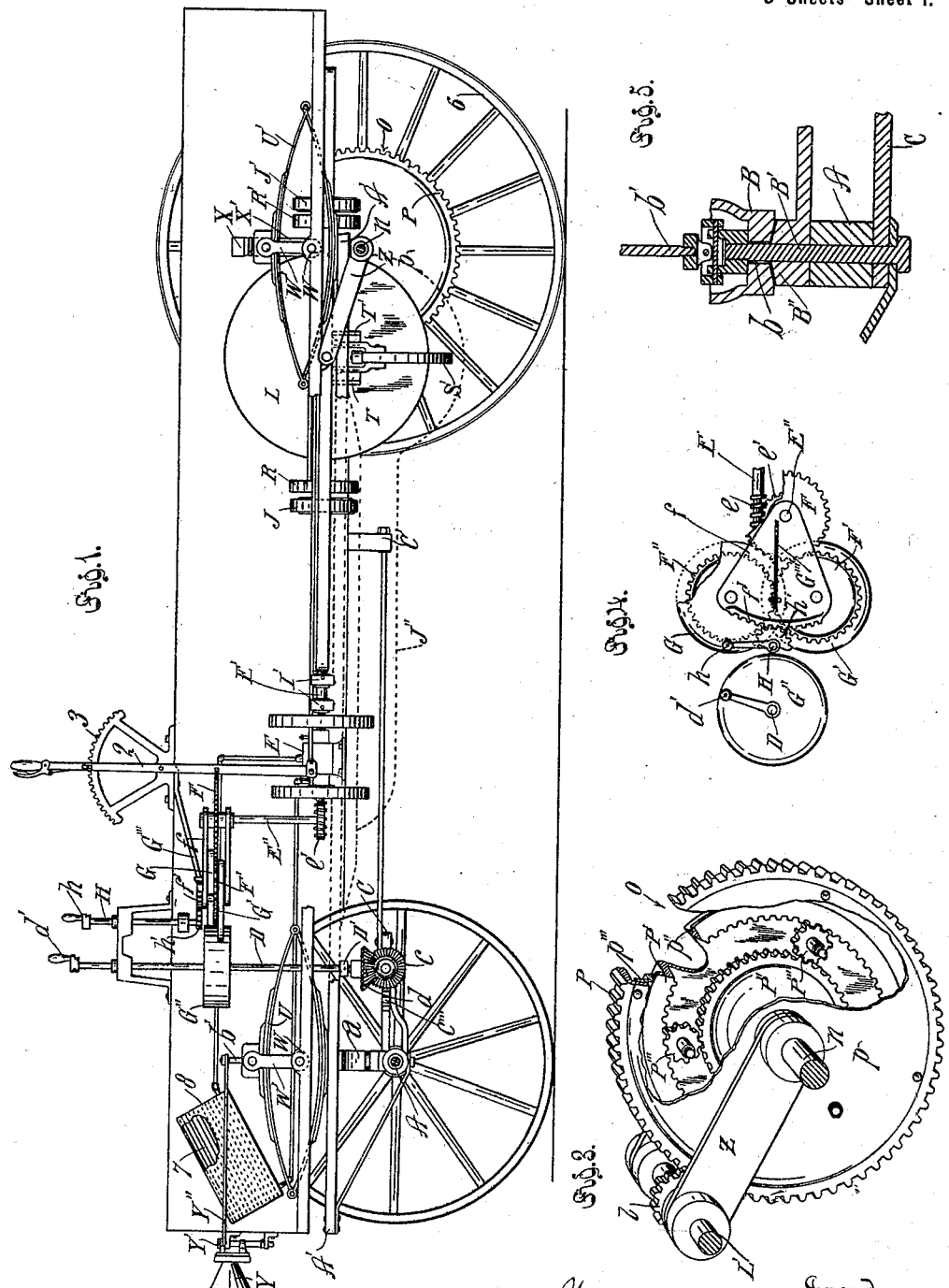
Witnesses
Perry Kingman.
E. A. Waterman.
Inventor
Wilton S. Schuyler
by Townsend Bros.
his attys

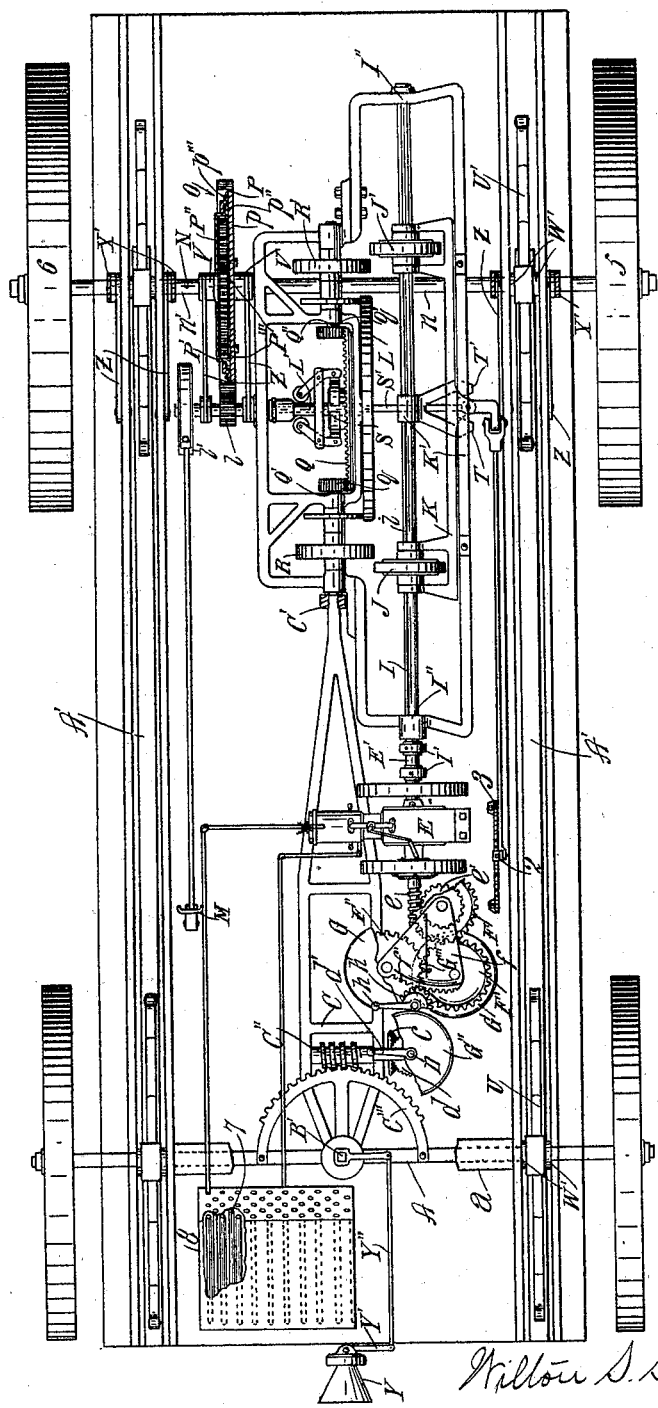

No. 624,689. Patented May 9, 1899.
W. S. SCHUYLER.
MOTOR VEHICLE.
(Application filed Apr. 1, 1898.)
(No Model.) 3 Sheets—Sheet 3.
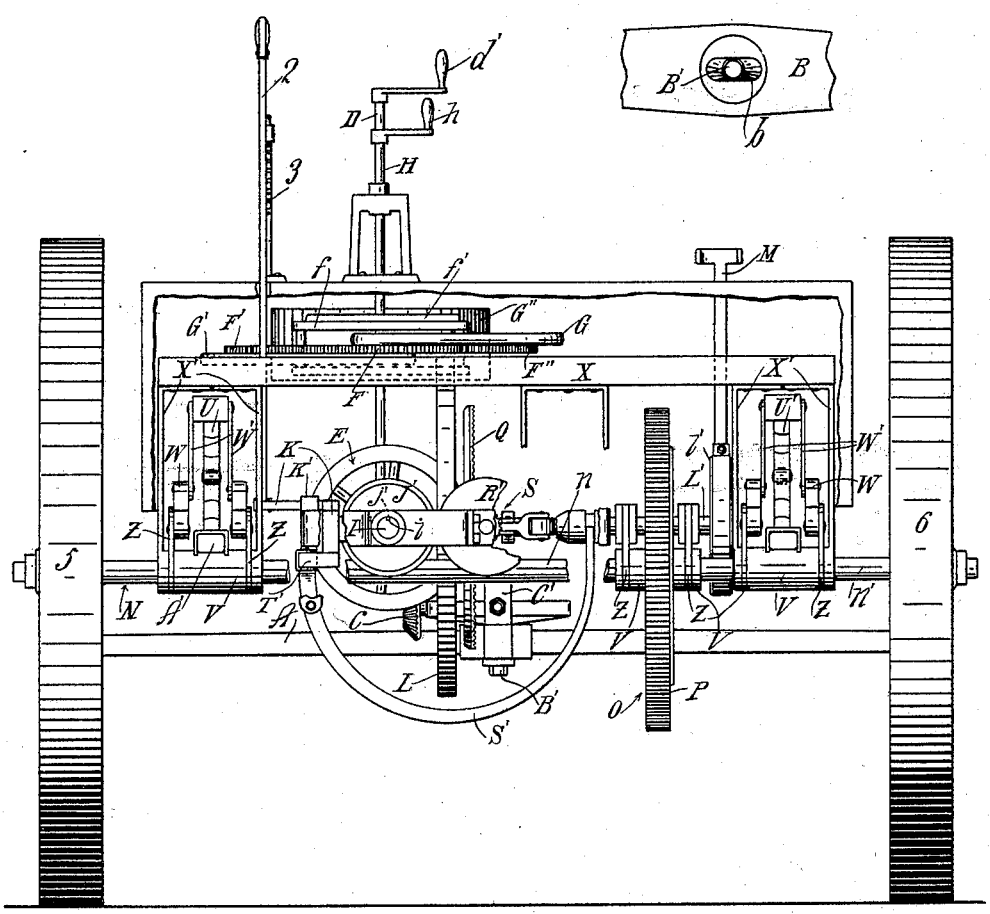

United States Patent Office.

WILTON SUMNER SCHUYLER, OF OCEANSIDE, CALIFORNIA.

MOTOR-VEHICLE.

SPECIFICATION forming part of Letters Patent No. 624,689, dated May 9, 1899.

Application filed April 1, 1898. Serial No. 676,128. (No model.)

*To all whom it may concern:*

Be it known that I, WILTON SUMNER SCHUYLER, a citizen of the United States, residing at Oceanside, in the county of San Diego and State of California, have invented new and useful Improvements in Motor-Vehicles, of which the following is a specification.

One particular object of my invention is to so arrange a motor-vehicle that the motor and all of the heavy mechanism may be carried upon a spring-supported vehicle-bed, so as to avoid the loss of power and the strain upon the machinery which is attendant upon those vehicles having the motor and its mechanism arranged upon a bed unyieldingly attached to the running-gears of the vehicle.

A particular object of my invention is to provide means whereby a motor-vehicle capable of satisfactory general use may be produced and without the use of pneumatic tires, which are expensive, liable to wear out, and unsatisfactory in use from various other reasons.

A further object of my invention is to provide improved means for steering the vehicle, so arranged that such mechanism can be operated by power from the motor or by hand-power, as desired, thus adapting my invention for use upon heavy trucks as well as light vehicles.

A further object of my invention is to provide means for rendering dust-proof the differential gear which connects the two parts of the hind axle with each other.

My invention comprises the various features of construction and combinations of parts hereinafter fully set forth and claimed.

The accompanying drawings illustrate my invention.

Figure 1 is a fragmental side elevation of a motor-vehicle embodying my invention. Fragments of the framework are broken away to expose the construction. Fig. 2 is a plan view with portions of the bed removed to expose the parts. Fig. 3 is a fragmental view showing the construction of the differential gear and the link connection of the hind axle with the shaft of the driving-pinion. Fig. 4 is a plan view of the power steering mechanism. Fig. 5 is a fragmental sectional view showing the pivotal connection of the front axle with the bolster. Fig. 6 is a rear elevation of my improved motor-vehicle. Fig. 7 is a plan view of the socket member B.

In the drawings, A represents the front axle of the vehicle, and A' represents a platform or frame connecting the front bolster $a$ of the vehicle with the hind axle. The front bolster is provided with an inverted concave socket member B, which is provided with a transverse slot $b$, within which the king-bolt B' of the vehicle plays. Upon the front axle of the vehicle is secured a supporting-point B'', which fits into the cup-shaped socket B, and the king-bolt B' passes downward through such point and through the axle. That portion of the king-bolt which passes through the axle and the point is rectangular, so that the bolt will turn with the axle, and the upper end of the king-bolt is connected by means of a knuckle-joint with an extension-bolt $b'$, which projects upward into the bed of the vehicle, for a purpose to be hereinafter explained. A worm-gear-supporting frame C is pivoted upon the lower end of the king-bolt at one end and at its other end is pivoted to a bracket C', secured to the platform, and a worm-gear C'' is journaled in the frame and meshes with an arc rack C''', which is secured to the front axle. The worm-gear is provided with a beveled cog-wheel $c$, and a steering-shaft D is provided with a beveled pinion $d$, which meshes with the cog-wheel. The shaft D extends upward through the bed of the vehicle and is provided at its top with a crank $d'$, whereby it may be rotated, if desired. A universal joint D' is arranged in the shaft between the crank and the pinion.

E is a motor which, as shown, is a gasolene-engine; but any suitable motor may be used. The engine-shaft E' of the motor is provided with a worm-gear $e$, which meshes with a gear-wheel $e'$, which is secured to a shaft E'', which is journaled in a vertical position and is provided at its top with a driving gear-wheel F. A frame $f$ is journaled upon this shaft, and a driven cog-wheel F' is journaled within the frame and meshes with the driving-wheel F. A second driven cog-wheel F'' is journaled in the frame and meshes with the first driven cog-wheel F'. Friction-wheels G G' are secured to the wheels F' F'', respectively, and upon opposite sides thereof, the friction-wheels being larger than the cog-wheels and projecting therebeyond. Upon the steering-shaft D is secured a friction-wheel G''', which is provided with a wide face, and the wheels G and G' are adapted to be brought one at a time into engagement with the friction-wheel G'' to thereby rotate such wheel in either direction. Fixed to the frame $f$ is an arc rack $f'$, and fixed to a shaft H, which is provided at its top with a crank-handle $h$, is a second rack $h'$, which meshes with the rack $f''$. A spring G''' holds the frame with the friction-wheels normally out of contact with the friction-wheel G''.

I is a driving-shaft, which is connected with the engine-shaft E' by means of universal couplings or joints I'. This driving-shaft is provided with a groove $i$, extending along its length, and two friction-wheels J J' are arranged to slide along the shaft and are provided with splines to slide in the grooves. These friction-wheels are each straddled by the forks of an adjusting-frame K, which slides on bearings K', provided on the supporting-frame of the machine, and is adapted to adjust the friction-wheels back and forth along the shaft.

L is a friction-disk which is arranged with its face in a plane parallel with the driving-shaft I and is secured to a supporting-shaft L', which is journaled in the frame and is provided with a driving-pinion $l$ and a brake-wheel $l'$, which is controlled by a brake-lever M, arranged in convenient position to be operated by the foot of the driver.

N represents the back axle of the vehicle. This axle is divided into two parts $n\ n'$, which are connected with each other by a differential gear O, and with this gear meshes the pinion $l$ upon the disk-wheel shaft L'.

The differential gear which I employ is rendered dust-proof by a simple and effective device which I will now explain.

P represents the externally-toothed gear-wheel, which is provided with a web $p$, connecting it with the hub of the wheel. This wheel is journaled upon one part $n$ of the hind axle.

P' is an internally-toothed gear-wheel, which is of less diameter than the gear-wheel P and is arranged to fit against the web $p$ of such gear-wheel. This wheel is rigidly fixed upon the part $n'$ of the back axle.

P'' is an externally-toothed internal gear-wheel, which is arranged in the chamber formed between the web $p'$ of the gear-wheel P'' and the web $p$ of the gear-wheel P and is rigidly fixed to the part $n$ of the hind axle.

P''' are pinions arranged meshing with the gear-wheel P' and the gear-wheel P'' and journaled upon spindles secured to the gear-wheel P. The gear-wheel P' is provided with an outwardly-projecting flange $p''$, and a flanged ring $p'''$ is arranged to encircle the flange $p''$ and to be secured to the web $p$ and to cover the joint between the gear-wheel P' and the flange $p$, thus to prevent the entrance of dirt into the differential gear.

Journaled upon the axle L' is a beveled cog-wheel Q', and journaled in the frame of the vehicle and at right angles with the shaft L' are two pinion-shafts Q' Q''. These shafts are provided with pinions $q\ q'$, which mesh with the cog-wheel Q and are also respectively provided with friction-wheels R R', which are fixed to the shafts and have the bearing-faces of their rims arranged in line with the extended plane of the bearing-face of the friction-disk L.

S is a clutch fixed upon the shaft L' and adapted to connect and disconnect the cog-wheel Q with such shaft. This clutch, as shown, is operated by means of a clutch-arm S', which is engaged by lugs T T', arranged upon the frame K in such relation with the clutch-arm and the friction-wheels J J' that the clutch will be operated to connect the cog-wheel with the shaft only when one of the friction-wheels J J' upon the driving-shaft is in operative engagement with one of the friction-wheels R R' upon the pinion-shafts and to release the clutch at all other times.

The motor and all of the driving mechanism excepting the differential gear are secured upon the bed of the vehicle, and the bed of the vehicle is secured to the frame or platform A' by means of springs U U', respectively arranged at the front and the rear ends of the vehicle-bed. The springs U' at the rear end of the bed are secured upon the tops of journal-blocks V, which journal the hind axle of the vehicle.

W represents eyes secured to the beams of the vehicle-bed, and W' are links which pivotally connect the eyes with the tops of the springs, so as to allow the bed of the vehicle to have a slight forward-and-backward swinging movement with relation to the running-gear of the vehicle.

Z are links connecting the bed with the hind axle. Two of these links are journaled upon the hind axle and the shaft L', and the rest of these links are pivoted in line with the axis of the shaft L'. These links thus serve to hold the pinion $l$ in mesh with the gear-wheel Q while the bed is moving up and down and also holds the back axle in line.

This permits the bed of the vehicle to move up and down upon its spring-supports and the pinion $l$ to move up and down in the arc of a circle upon the gear-wheel P without being disconnected from such gear-wheel, so that the motor may be run continuously and operate to rotate the differential gear and to thus drive the vehicle without interfering with the spring movement of the bed of the vehicle, the link connection between the eyes and the tops of the springs allowing the vehicle-bed to move forward or backward to accommodate itself to the position of the pinion upon the gear-wheel P. The pinion $l$ when in its normal position is arranged near a line passing horizontally through the axis of the gear-wheel P, so that the range of movement forward and backward is very slight even though the movement of the bed should be considerable.

X indicates a supporting-beam, which is arranged above the tops of the springs and is rigidly connected with the journal-blocks V of the hind axle by means of ties X'. Two bearings are provided for each portion $n\ n'$ of the divided axle, and by means of the ties X' and the supporting-beam X and the links Z, connecting the bearings with the bed, the journal-bearings and the axle are held firmly in position and prevented from getting out of line with each other. This supporting-beam X also operates as a stop, with which the springs engage when the power applied to propel the vehicle is sufficient to cause the pinion to climb up the gear-wheel P and to thus tend to raise the vehicle-bed above its proper position.

Y is a headlight which is pivotally secured to the front end of the vehicle-bed. The headlight is provided with a crank-arm Y', and an operating-rod Y" is pivoted at one end upon the crank-arm and is pivotally secured at its other end to a crank-arm secured to the extended king-bolt B' of the front running-gears. The two crank-arms are of equal length, so that thereby when the front axle is turned to cause the vehicle to change its line of travel the headlight is also turned by the operating-arm to throw the light in a direction corresponding with the line of travel of the vehicle.

In practice, the device being arranged ready for operation, the motor is set in motion to rotate the engine-shaft E', and this motion is communicated to the driving-shaft I, which is continuously rotated, thus continuously rotating the friction-wheels J J'. When the operating-lever 2, which controls the frame K, is arranged at its central position upon the arc rack 3, the friction-wheels J J' are held in position where they are free to rotate without operating any of the driving mechanism. The worm-gear $e$ continuously rotates the gear-wheel $e'$, which rotates the shaft E" and the driving gear-wheel F. The driving-wheel F also rotates the first driven cog-wheel F' and the second driven cog-wheel F", and such wheels are thus driven in opposite directions, and thereby continuously rotate the friction-wheels G and G' in opposite directions. The spring G''' holds the frame in its normal position, in which position the friction-wheels are held free from contact with the friction-wheel G" and are continuously rotated with a minimum expenditure of power.

When it is desired to drive the vehicle ahead, the lever 2 is pushed forward, thus carrying the frame K and the friction-wheels J J' toward the rear of the machine. The first operation is to bring the friction-wheel J into contact with the friction-wheel R, which operates the pinion-shaft Q' and the pinion $q$ to drive the beveled cog-wheel Q. The same motion brings the lug T into engagement with the clutch-arm S' and throws the clutch S into engagement with the wheel Q, causing such wheel to rotate with the shaft L' and to thereby rotate the pinion $l$ and the differential gear P and to drive the vehicle slowly forward. Further forward movement of the lever 2 carries the friction-wheel J out of contact with the wheel R and carries the lug T out of engagement with the clutch-arm S', thus releasing the clutch and disconnecting the cog-wheel Q from the shaft L'. Further movement of the lever carries the friction-wheel J into engagement with the friction-disk L at the periphery thereof, rotating such disk, and thus driving the pinion $l$ and rotating the gear-wheel P to thus rotate the hind axle N and the supporting-wheels 5 6, which are rigidly secured to the two parts of the axle, and driving the vehicle forward. When it is desired to change the line of travel of the vehicle, the frame $f$ may be operated by means of the crank $h$ to carry one or the other of the friction-wheels G G' into engagement with the friction-wheel G" and to rotate such wheel and to thereby rotate the shaft D and the pinion $d$ to rotate the worm-gear G" and to thereby operate the arc rack C''' and turn the front axle. At the same time the operating-rod Y" operates to swing the headlight upon its pivotal support and to throw the light in the direction in which the vehicle is guided. As the vehicle turns, the differential gear O, which connects the two parts $n\ n'$ of the hind axle, permits one of the hind wheels to travel slower than the other and to thus turn the corner without any twisting or wrenching upon the axle of the vehicle. The transverse slot $b$ in the socket member B permits the king-bolt B' to play laterally when the front axle is tilted by the wheels passing over uneven places.

The motor and all of the driving mechanism excepting the differential gear, the steering worm-wheel, and rack are mounted upon the spring-supported platform or bed of the vehicle, which allows the vehicle to be propelled over rough ground with less power than is possible where a dead-weight must be raised whenever the supporting-wheels are obliged to travel over an elevation, and as the vehicle is moved up and down the pinion $l$ rotates up and down the gear-wheel P without materially restricting the movement of the vehicle-bed.

By throwing the friction-wheel J nearer to the center of the friction-disk L the rate of travel of the vehicle will be correspondingly increased, and when it is desired to stop the friction-wheel is moved outward off of the friction-disk and the brake is applid to the brake-wheel $l'$, thus bringing the vehicle to a standstill.

When it is desired to cause the vehicle to travel backward, the lever 2 is moved toward the rear, thus bringing the friction-wheel J' into engagement with the wheel R' and afterward into engagement with the friction-disk L, rotating such disk in a direction the reverse from that in which it is rotated by the friction-wheel J.

When it is desired to ascend a hill or a steep inclination, the friction-wheel J is thrown into engagement with the friction-wheel R and the lug T, operating against the clutch-arm S', throws the clutch S into engagement with the cog-wheel Q, locking such wheel to the shaft L' and causing such shaft to rotate as the cog-wheel is rotated. By reason of the friction-wheel R being of substantially the same diameter as the friction-wheel J and of the smallness of the pinion $q$ compared with the cog-wheel Q the power is geared back and greatly increased over that which is exerted against the friction-disk L by the friction-wheel J, and a motor which, acting upon the friction-disk L, will propel the vehicle upon level ground at a high rate of speed will when thrown into operative engagement with the auxiliary driving mechanism be geared back, so that the same power will carry the vehicle up a steep hill at a slower rate of speed.

To produce slow reverse movement of great power, the friction-wheel J' is thrown into engagement with the friction-wheel R' and the lug T' throws the clutch S into engagement with the wheel Q in the manner just described.

It will be observed that in my device the friction-wheels first engage with the friction-disk at the periphery thereof and that a slow motion is at first thereby imparted to the vehicle. The rate of speed can be gradually increased by moving the friction-wheel nearer to the center of the disk, and the slowing down is accomplished by causing the friction-wheel to travel from the center of the disk outward.

The shaft I is mounted in adjustable bearings I'', so that such shaft may be adjusted to take up the wear of the friction-wheels J J'. These adjustable bearings are of the form ordinarily used for this purpose, and detailed description thereof herein is not necessary.

It will be observed that by my construction the differential gear is rendered practically dust-proof. The friction-disk L and the friction-wheels J J' are protected by means of a casing J'', secured to the under part of the bed of the vehicle.

S indicates my improved water-cooler. This consists of a receptacle provided with tubes 7, passing through the receptacle and inclined at an angle to the horizon. This cooling device is preferably arranged at the front end of the vehicle, with the mouths of the inlet-tubes presented toward the front of the vehicle. By my arrangement of the water-cooling device the heated water flows from the water-jacket of the engine into the cooler and by reason of the air-tubes being inclined the air in such tubes becomes heated and rises, passing out of the top of the tube and producing a continuous current of air through the tubes, which effectually cools the water therein. By presenting the mouths of the tubes toward the front of the vehicle the forward motion of the vehicle accelerates the speed with which the air passes through the tube, and consequently the cooling capacity of the device.

Now, having described my invention, what I claim as new, and desire to secure by Letters Patent, is—

1. In a vehicle, the combination set forth of a support; a headlight pivoted to the support; an operating-arm having one end attached to the headlight and the other end attached to the running-gears of the vehicle and adapted to turn the headlight to correspond with the line of travel of the vehicle.

2. In a motor-vehicle, the combination set forth of a driving-shaft; a driving-wheel secured to the shaft; a driven wheel arranged to be rotated by the driving-wheel; a second driven wheel arranged to be rotated by the first driven wheel; steering mechanism connected with the front axle of the vehicle; a friction-wheel arranged to operate the steering mechanism; and means arranged to swing the two driven wheels to bring one of said wheels at a time in engagement with the friction-wheel.

3. In a motor-vehicle, the combination set forth of a driving-shaft provided with a driving cog-wheel; a driven cog-wheel arranged to mesh with the driving cog-wheel; a second driven cog-wheel arranged to mesh with the first driven cog-wheel; friction-wheels, one arranged upon one side of the first driven wheel and projecting therebeyond and the other arranged upon the opposite side of the second driven wheel and projecting therebeyond; vehicle-steering mechanism connected with the front axle; a friction-wheel adapted to operate such steering mechanism; and means adapted to bring either of the driven friction-wheels into contact with the steering friction-wheel.

4. In a motor-vehicle, the combination set forth of a bed; the front axle pivotally secured to the bed; an arc rack secured to the front axle; a worm-gear meshing with the arc rack; a beveled cog-wheel secured to the worm-gear; a beveled pinion meshing with the cog-wheel; a shaft extending from the beveled pinion upward to the bed of the vehicle; and a universal joint arranged in the shaft above the beveled pinion.

5. In a motor-vehicle, the combination set forth of a lower platform rigidly connected at one end to the front bolster of the vehicle and secured at its other end to the hind axle; a front axle pivotally secured beneath the bolster; an arc rack secured to the axle; a supporting-frame pivotally secured to the king-bolt at one end and to the lower platform at its other end; a worm-gear carried by the frame and meshing with the arc rack;

means for operating the worm-gear; and a spring-supported vehicle-bed arranged above the platform.

6. In a motor-vehicle, the combination set forth of a platform connecting the hind axle of the vehicle with the front bolster; a driven cog-wheel arranged upon the hind axle; a spring-supported bed arranged above the platform; a driving-pinion carried by the bed and meshing with the cog-wheel; links connecting the hind axle and the shaft of the driving-pinion; and a motor arranged upon the bed for rotating the pinion.

7. In a motor-vehicle, the combination set forth of a platform connecting the hind axle with the front bolster; such hind axle, divided into two parts, each part having a supporting-wheel rigidly fixed thereto; a differential gear connecting the two parts of the axle with each other; a spring-supported bed arranged above the platform; a driving-pinion for driving the differential gear; links connecting the hind axle with the bed of the vehicle and adapted to hold the pinion in mesh with the differential gear; and a motor carried by the bed and adapted to operate the driving-pinion.

8. In a motor-vehicle, the combination set forth of the hind axle divided into two parts, each part having a supporting-wheel rigidly fixed thereto; a differential gear connecting the two parts of the axle with each other; the vehicle-bed; a shaft journaled in the vehicle-bed and provided with a friction-disk; a driving-pinion fixed upon the disk-shaft and adapted to drive the differential gear; a driving-shaft journaled parallel with the face of the friction-disk and provided with a groove; a friction-wheel arranged upon said shaft and provided with a spline to slide in the groove; a brake-wheel secured upon the shaft of the friction-disk; a friction-band for engaging with the brake-wheel; and a motor for rotating the driving-shaft.

9. In a motor-vehicle, the combination set forth of the platform having the running-gears secured thereto; the spring-supported vehicle-bed arranged above the platform; a motor carried upon the vehicle-bed; driving mechanism carried by the running-gears; and compensating mechanism connecting the motor with the driving mechanism and adapted to allow the vehicle-bed to move upon its springs without disconnecting the motor from the driving mechanism.

10. In a motor-vehicle, the combination set forth of a platform; the hind axle journaled to said platform, divided into two parts, each part provided with a supporting-wheel rigidly fixed thereto; a differential gear connecting the two parts of the axle with each other; a spring-supported bed arranged above the platform; a disk-shaft journaled to the bed; a pinion secured upon the disk-shaft and arranged to drive the differential gear; links holding the pinion in mesh with the differential gear; a friction-disk secured upon the disk-shaft; a cog-wheel journaled upon the disk-shaft; a clutch fixed upon the disk-shaft and adapted to connect the cog-wheel with the shaft; a pinion meshing with the cog-wheel; a friction-wheel secured upon the pinion-shaft; a driving-shaft; a friction-wheel secured upon the driving-shaft and adapted to operate the friction-wheel upon the pinion-shaft, and to also operate the friction-disk; means for shifting the friction-wheel along the driving-shaft; and means for throwing the clutch into its operative position only when the friction-wheel upon the driving-shaft is in engagement with the friction-wheel upon the pinion-shaft.

11. In a motor-vehicle, the combination set forth of a gear-wheel fixed to the hind axle of the vehicle; a shaft journaled to the frame of the vehicle and provided with a pinion adapted to drive the gear-wheel, and also provided with a friction-disk fixed to the shaft; a beveled cog-wheel journaled upon the shaft; a clutch adapted to connect and disconnect the beveled cog-wheel with the shaft; two shafts arranged upon opposite sides of the beveled cog-wheel and at right angles to the shaft of the friction-disk, such shafts being each provided with a beveled pinion meshing with the beveled cog-wheel and also provided with a friction-wheel having its bearing-face arranged in line with the extended plane of the face of the friction-disk; a grooved driving-shaft arranged parallel with the plane of the friction-disk; two friction-wheels arranged to slide along the shaft and each provided with a spline sliding in the groove; an adjusting-frame arranged to slide both said friction-wheels back and forth along the shaft; and means arranged upon the frame and adapted to operate the clutch to connect the beveled cog-wheel with the shaft of the friction-disk only when one of the friction-wheels upon the driving-shaft is in engagement with one of the friction-wheels which operate the beveled cog-wheel.

12. In a motor-vehicle, the combination set forth of the back axle divided into two parts and connected by means of a differential gear; a friction-disk; a shaft fixed to the disk and provided with a pinion arranged to drive the differential gear; a cog-wheel journaled on the shaft; a clutch for connecting the cog-wheel with the shaft; pinions for rotating the cog-wheel; means for driving the friction-disk; means for driving the pinions; and means for operating the clutch to connect the cog-wheel with the disk-shaft when either of the pinions are operated.

13. In a differential gear, the combination set forth of the divided shaft; an externally-toothed cog-wheel journaled upon one member of the divided shaft; the internally-toothed cog-wheel secured to the other member of such shaft and provided with an outwardly-projecting flange; the externally-toothed internal gear-wheel fixed upon the other member of the shaft; the pinions meshing with the internal externally-toothed gear-wheel and the internally-toothed gear-wheel and journaled upon the shafts secured to the outer externally-toothed gear-wheel; and an annular flanged ring secured to the externally-toothed gear and embracing the flange of the internally-toothed gear-wheel.

14. In a motor-vehicle, the water cooling apparatus set forth comprising a tank; and inclined air-tubes passing through the tank, opening toward the front of the vehicle and sloping upward toward the rear.

15. In a motor-vehicle, the combination set forth of the shaft of the vehicle; the driven wheel secured thereto; the driving-wheel arranged to drive the driven wheel; the friction-disk arranged to operate the driving-wheel; auxiliary driving mechanism arranged to be connected with and disconnected from the driving-wheel; and a friction-wheel arranged at right angles to the friction-disk and arranged to operate the auxiliary driving mechanism.

16. In a motor-vehicle, the combination set forth of the rear axle divided into two parts each being provided with a supporting-wheel rigidly fixed thereto; differential gear connecting the two parts of the axle with each other; a pinion arranged to operate the gear; auxiliary driving mechanism arranged to be operated to drive the pinion; a friction-wheel arranged in a plane at right angles to the plane of the disk and to operate the auxiliary driving mechanism; and a driving friction-wheel arranged to operate the driven friction-wheel or the friction-disk.

17. In a motor-vehicle, the combination set forth of the front axle provided with an arc rack; a worm-gear meshing with the arc rack; a shaft for operating the worm-gear; a friction-wheel mounted upon the shaft; two friction-wheels arranged to be swung to bring either of said wheels into engagement with the friction-wheel upon the shaft; and means for rotating the friction-wheels in opposite directions.

18. In a motor-vehicle, the combination set forth of a motor; the engine-shaft; a worm-gear fixed upon the engine-shaft; the gear-wheel fixed upon the shaft and meshing with the worm; the driving-wheel fixed upon the shaft; a frame journaled upon the shaft; a driven wheel journaled in the frame and engaging with the driving-wheel; a second driven wheel journaled in the frame and engaging with the first driven wheel; steering mechanism; a friction-wheel for operating the steering mechanism; and means for throwing either of the two driven friction-wheels into engagement with the steering-mechanism friction-wheel.

19. In a motor-vehicle, the combination set forth of a motor; a worm-gear fixed upon the engine-shaft; a shaft provided with a driving-wheel; a gear-wheel fixed to the shaft and meshing with a worm-gear; a frame pivoted upon the shaft and carrying two oppositely-rotating friction-wheels; means connecting the friction-wheels with the driving-wheel to rotate the wheels in opposite directions; an arc rack fixed upon the frame; a shaft provided with a crank-arm; and an arc rack fixed to the shaft and meshing with the arc rack fixed upon the frame.

20. In a motor-vehicle, the combination set forth of the frame connecting the front bolsters with the hind axle; springs secured to the frame; a vehicle-bed arranged above the frame; brackets depending from the vehicle-bed; and links connecting the lower end of the bracket with the top portion of the spring.

21. In a motor-vehicle, the combination set forth of the divided axle; the differential gear connecting the two parts of the shaft with each other; the bearings journaling the shaft; the supporting-beam arranged above the gear; the ties rigidly connecting the bearings with the supporting-beam; the frame of the vehicle-bed arranged between the shaft and the beam; the springs secured upon the axle; the links securing the frame of the bed to the tops of the springs; and a pinion journaled upon the frame of the vehicle-bed and meshing with the differential gear upon the axle.

WILTON SUMNER SCHUYLER.

Witnesses:
ALFRED I. TOWNSEND,
F. M. TOWNSEND.